United States Patent [19]

MacCracken

[11] Patent Number: 4,669,154

[45] Date of Patent: Jun. 2, 1987

[54] SUPPORT ELEMENTS FOR VERTICAL MEMBERS

[76] Inventor: William H. MacCracken, 3065 Ravenna Rd., Hudson, Ohio 44236

[21] Appl. No.: 703,612

[22] Filed: Feb. 21, 1985

[51] Int. Cl.$^4$ ............................................. F16G 11/00
[52] U.S. Cl. ............................ 24/115 R; 24/232 R; 59/85; 59/93; 254/402
[58] Field of Search .......... 52/148; 24/115 R, 232 R, 24/116 R, 132 R, 132 AA; 254/402, 405, 406; 59/84, 85, 87–89, 93; 70/459; 272/8 R; 273/144 A

[56] References Cited

U.S. PATENT DOCUMENTS

| | | | |
|---|---|---|---|
| 140,024 | 6/1873 | Field | 24/232 X |
| 168,258 | 9/1875 | Jopson | 70/459 |
| 767,073 | 8/1904 | Livingston et al. | 59/87 |
| 1,535,060 | 4/1925 | Tirrill | 59/89 |
| 1,655,296 | 1/1928 | Tapio | 273/144 A |
| 3,330,106 | 7/1967 | Spilhaug | 59/85 |
| 3,599,298 | 8/1971 | Anderson | 24/232 |
| 4,324,121 | 4/1982 | Richter | 70/459 |

FOREIGN PATENT DOCUMENTS

| | | | |
|---|---|---|---|
| 99104 | 5/1923 | Switzerland | 59/89 |
| 103274 | 2/1924 | Switzerland | 59/85 |

Primary Examiner—Kenneth J. Dorner
Assistant Examiner—James R. Brittain
Attorney, Agent, or Firm—Renner, Kenner, Greive, Bobak & Taylor

[57] ABSTRACT

A connector (10) interposed in a support element (L) by attachment to first and second displaced ends (L$_1$, L$_2$) thereof to selectively permit an object to pass transversely through the longitudinal axis of the support element while employed to brace a structure including a first linkage (12, 113) connected to the first end (L$_1$) of the support element, a second linkage (11, 114) connected to the second end (L$_2$) of the support element, and means for coupling the first and second linkages (14; 111, 112) being attached to said first linkage and the second linkage and having a receiver (16; 111, 112) selectively opening to either side of the support element to permit an object to pass transversely through the longitudinal axis of the support element.

16 Claims, 3 Drawing Figures

SUPPORT ELEMENTS FOR VERTICAL MEMBERS

TECHNICAL FIELD

The present invention relates generally to support elements for structures such as masts, poles, beams, towers and like vertical members. More specifically, the present invention pertains to support elements which brace and stabilize antenna masts and which facilitate the movement of large objects such as an antenna relative thereto.

BACKGROUND ART

The use of guy lines as support elements for masts, poles, beams, towers and like vertical members is well known. Typically, a tall, vertically oriented structure, such as an antenna mast, requires a plurality of support elements to prevent the mast from bending, swaying or collapsing under stress forces resulting from environmental influences, particularly wind, coupled with the inherent high center of gravity of the mast or mast and antenna combination. The mast or pole may be braced with a set of lines having one end affixed to the mast and made fast at the opposite end to a suitably rigid structure such as a pin anchored in the ground. Such a set usually consists of three guy lines, each with one end affixed to the mast at the same vertical position along the mast, and the other end anchored to the ground at a point horizontally displaced from the base of the mast such that the ends of the guy lines are corners or points of a right triangle with the base of the mast forming the right angle corner or point thereof. More lines, of course, per set, may be used for added stability and a plurality of sets are commonly employed on taller masts, with each set being disposed at different vertical positions along the mast, usually with one set affixed near the top of the mast. Guy lines may be made from a wide variety of materials such as rope, wire or steel cord, all of single or multiple strands depending on the particular application.

A typical antenna assembly may include a mast, braced by guy lines, which carries an antenna array affixed at the top thereof. A great number of such antenna arrays are a generally planar configuration having a central boom mounting the elements at their approximate middle and perpendicular to the boom. Typically the arrays require frequent service, repair or replacement, necessitating raising and lowering of the array as by hoisting it with a block and tackle arrangement located at the top of the mast. The arrays are normally quite large and bulky, with booms ranging in length from 12 to 60 feet or more of 2 to 3 ½ inch diameters and having thirty to sixty foot element lengths not being uncommon. Due to dimensions of this order, when the array is raised or lowered adjacent or near to the mast, the guy lines may obstruct its path, particularly along those points near where the guy lines converge and are affixed to the mast. Consequently, either the array must be worked around and between the guy lines, often a cumbersome and dangerous operation for a person on the mast or a ladder supported thereby; or the array must be moved outside of a perimeter defined by the radially distal extent of the guy lines, as with a cherry picker or other hoisting apparatus, thereby creating a less dangerous but highly expensive operation due to the cost for use of such apparatus.

It is, therefore, apparent that the state of the art is such that a need exists for apparatus by which an object can be moved along a directional axis intersected by a support element and be manipulated to pass through the support element without requiring removal of the interfering element or having to circumvent it.

DISCLOSURE OF THE INVENTION

It is, therefore, the primary object of the present invention to provide new and improved apparatus for bracing and stabilizing a mast type structure with a guy line.

It is another object of the present invention to provide apparatus which maintains the supporting force of a guy line while at the same time enabling an object such as an antenna boom or element to pass generally transversely through the longitudinal axis of the guy line.

It is yet another object of the present invention to provide guy line apparatus which braces a mast and allows relatively large objects such as an antenna to be raised or lowered adjacent the mast without interference from bracing guy lines.

It is a further object of the present invention to provide a connector member for guy lines which can be actuated with minimal effort and minimal interference with the guy lines or structure.

These and other objects are accomplished by the improvements comprising the present invention, a preferred embodiment and one alternative embodiment of which are disclosed herein by way of example as comprising the best known modes of carrying out the invention. Various modifications and changes in details of construction are comprehended within the scope of the appended claims.

In general, a connector according to the invention is interposed in a support element by attachment to first and second displaced ends thereof to selectively permit an object to pass transversely through the longitudinal axis of the support element while employed to brace a structure including a first linkage connected to the first end of the support element, a second linkage connected to the second end of the support element, and means for coupling the first and second linkages being attached to the first linkage and second linkage and having a receiver selectively opening to either side of the support element to permit an object to pass transversely through the longitudinal axis of the support element.

PREFERRED EMBODIMENT OF THE INVENTION

Figure 1:
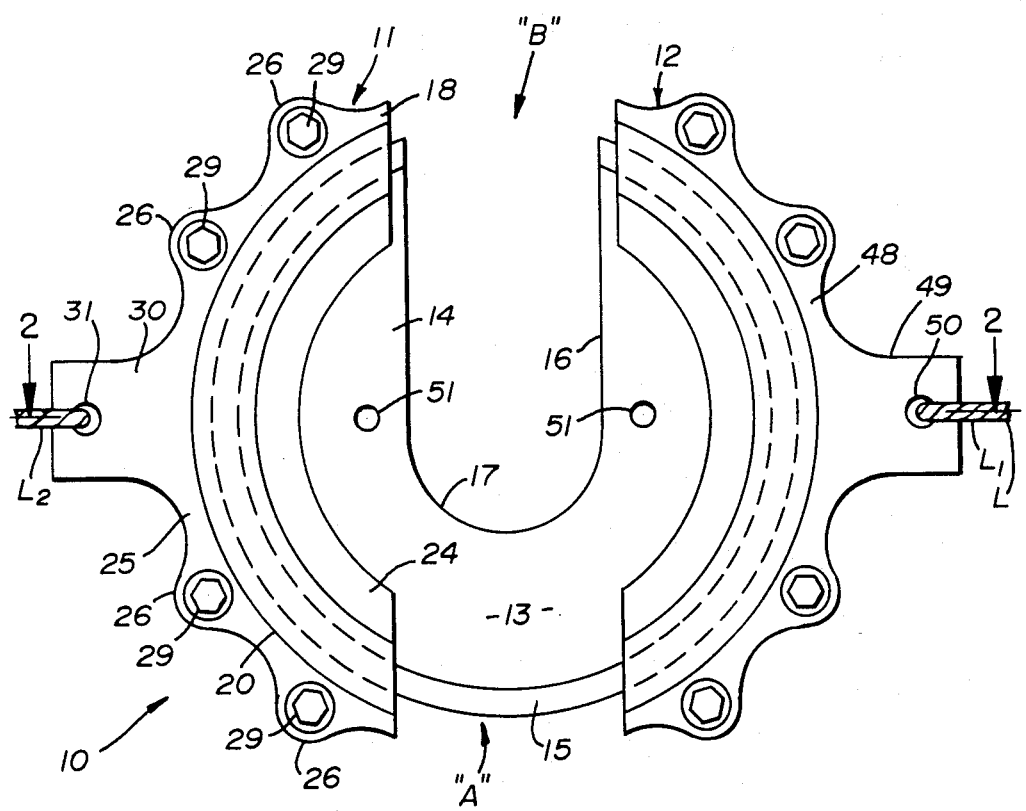
FIG. 1 is a top plan view of a fragmentary portion of a guy wire having interposed therein a connector embodying the concepts of the present invention.

Referring initially to FIG. 1 of the drawings, a connector assembly according to the concepts of the present invention, generally indicated by the numeral 10, is used in conjunction with a guy line L for bracing a vertical structure. The guy line L in known fashion extends from the ground to a tower or pole and has the connector 10 interposed between intermediate ends $L_1$ and $L_2$ of the guy line L which are affixed thereto, the connector preferably being located proximate the tower. The connector 10 includes a pole linkage assembly, generally indicated by the numeral 11, a ground linkage assembly, generally indicated by the numeral 12, and a coupling plate 13. Linkage assemblies 11 and 12 may be and preferably are of similar construction, therefore, a detailed description of only linkage assembly 11 is given herein, it being understood that linkage assembly 12 may be substantially similar.

Coupling plate 13 as shown in the preferred embodiment includes a generally circular disk 14 with a flanged rim 15 which extends axially outward from the radially outer circumferential perimeter of disk 14. Disk 14 and rim 15 may be of unitary construction, formed by conventional machining processes well known to persons skilled in the art. Disk 14 also includes a substantially U-shaped cutout 16 of sufficient width to allow cutout 16 to receive an antenna array boom as will be more fully explained hereinafter. As shown, the cutout 16 may conveniently end in a semicircular portion 17 which has a radius of one-half of the width of cutout 16 and which is preferably centered at the center of disk 14.

Figure 2:
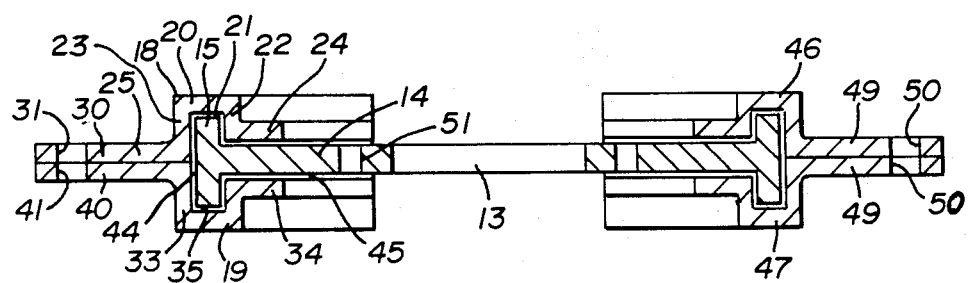
FIG. 2 is a sectional view of the connector of the present invention taken substantially along line 2—2 of FIG. 1.

As best shown in FIGS. 1 and 2, pole linkage assembly 11 comprises two substantially similar members; an upper channel plate 18 and a lower channel plate 19. Upper channel plate 18 includes an arcuate face portion 20 with an arcuate channel 21 delimited by a radially inner wall 22 and a radially outer wall 23 of arcuate face portion 20. An inner arcuate flange 24 extends radially inward from inner wall 22 and an outer arcuate attachment flange 25 extends radially outward from outer wall 23. Outer flange 25 may include a plurality of protuberances 26 with holes to accept retainer bolts 29. Outer flange 25 also may include a further radial extension 30, located preferably about the midpoint of arcuate portion 20, with a hole 31 therethrough which is of sufficient diameter to accept guy line $L_2$ for fixed attachment thereat.

Upper channel plate 18 and lower channel plate 19 may be of substantially similar construction. Thus, lower channel plate 19 includes an arcuate face portion 33, an inner flange 34, an arcuate channel 35 and an outer flange (not shown). The outer flange of plate 19 further includes a plurality of protuberances identical to protuberances 26 with a set of holes which accept bolts 29, a further radial extension 40 and a machined hole 41 which accepts guy line end $L_2$ which is also threaded through hole 31.

Upper channel plate 18 and lower channel plate 19 may be fastened together, as by bolts 29 and mating locking nuts (not shown), with coupling plate 13 fittingly disposed therebetween. As best shown in FIG. 2, when plates 18 and 19 are aligned and fastened together, channels 21 and 35 form an arcuate track 44 which accepts disk rim 15. Inner arcuate flanges 24 and 34 form a second arcuate track 45 which accepts the axially outer surfaces of circular disk 14. Tracks 44 and 45 form, essentially, a T-track wherein rim 15 and the outer axial surfaces of disk 14 are disposed. The T-track should be of sufficient cross-sectional area and of the appropriate arcuate curvature to allow coupling plate 13, more precisely rim 15 and the outer axial surfaces of disk 14, to cooperate with the T-track such that plate 13 can freely and easily traverse therethrough, as when coupling plate 13 is rotated in a clockwise or counterclockwise direction about its center. It will be appreciated that in addition to allowing plate 13 to traverse therethrough, the T-track also provides a retaining function in that upper and lower channel plates 18 and 19, when fastened together, effectively form a collar around rim 15. Thus, although coupling plate 13 is free to rotatably traverse through the T-track, pole linkage assembly 11 cannot be separated from coupling plate 13 without removal of the bolts 29.

As previously indicated, ground linkage assembly 12 may be of substantially identical construction as pole linkage assembly 11, and likewise allows coupling plate 13 to freely traverse therethrough when plate 13 is rotated in a clockwise or counterclockwise direction. Ground linkage assembly 12 may include an upper channel plate 46 and a lower channel plate 47, each having an outer flange 48 with radial extensions 49 having machined holes 50 which accept a guy line end $L_1$.

Thus, coupling plate 13 operatively joins linkage assemblies 11 and 12 so as to maintain continuity of the bracing force of guy line L. Assemblies 11 and 12 should have their arcuate length limited such that when extensions 30 and 49 are generally diametrically opposed around coupling plate 13, as in the operative position of FIG. 1, they form an opening "A" and an opening "B" which are diametrically opposed and generally transversely positioned relative to a directional axis defined by holes 31 and 50, and of sufficient width that cutout 16 may be wholly accessed therethrough. Persons skilled in the art will appreciate that the integrity and strength of connector assembly 10 will depend upon a number of design factors such as making the width of cutout 16 sufficiently large to provide an extent of clearance over the largest antenna boom diameter to be accommodated yet at a minimum relative to the diameter of plate 13, making the linkage assemblies 11, 12 of as large angular sectors as possible while maintaining diametrically opposed separations therebetween of the width of cutout 16 plus a minimum clearance, and making the chord length of linkage assemblies 11, 12 substantially greater than the width of cutout 16 of coupling plate 13.

Circular disk 14 also may include machined holes 51 which accept a lugged spanner wrench to facilitate rotating coupling plate 13. Thus, device 10 may be actuated with minimal effort and without interference from the guy line L.

An exemplary description of a use of the present invention may involve tall antenna masts which are exemplary vertical structures that are commonly braced by a plurality of guy lines. If a repair of the antenna array carried at the top of the mast is required, the array must first be lowered and then raised back again to the top of the mast after repair. The array may have elements as wide as 60 feet or more and thus may become entangled with the guy lines during movement. A typical flat antenna array of the yagis variety commonly includes a boom with a plurality of spaced elements transversely oriented to the longitudinal axis of the boom. To avoid the entanglement problem, the apparatus disclosed herein may be made an integral member of one or more of the guy lines. A guy line L is secured at one end to an appropriate ground anchor and the opposite end $L_1$ is secured to ground linkage assembly 12 through hole 50 by any of a plurality of methods known to persons skilled in the art. Another guy line is connected at one end to the antenna mast (not shown) and at the opposite end $L_2$ to pole linkage assembly 11 through hole 31, 41 by any of a plurality of methods known to persons skilled in the art. Alternatively, pole linkage assembly 11 could be connected directly to the antenna mast so as to allow the antenna array to be raised directly adjacent the antenna mast.

Connector 10 may be oriented such that the longitudinal center line of cutout 16 is generally transverse the longitudinal axis of the guy lines. As the antenna array is raised along a directional axis generally transversely of the longitudinal axis of the guy lines, as with the boom generally horizontal, a center portion of the boom passes transversely between assemblies 11 and 12, as through opening "B" and into cutout 16 which is aligned therewith. Cutout 16 will act, in essence, as a channel for passing the boom transversely of the guy line. A spanner wrench may then be used in cooperation with holes 51 to turn coupling plate 13 through 180 degrees so that cutout 16 is now substantially aligned with opening "A". The boom then may be passed out through channel 16 and thereafter through opening "A" and then moved further up along its desired direction of movement without any interference from guy line 51. Thusly, an antenna array may move along a directional axis intersected by the longitudinal axis of a guy line and pass through a channel 16 without having to circumvent the guy line or remove the same, with full bracing tension maintained in the guy line. The connector 10 may be used when lowering an antenna array by simply reversing the above procedure.

It will be appreciated that connector 10 may be located anywhere along a guy line where an object is expected to interfere with the guy line. It is considered to be well within the scope of the present invention that the shapes of the various elements may also be altered depending on the particular application. For example, outer flanges 30 and 49 may be of many different configurations to accommodate different methods of affixing the guy lines thereto; and, cutout 16 may be sized according to the cross-sectional shape of the largest of the objects to be accommodated thereby.

Figure 3:
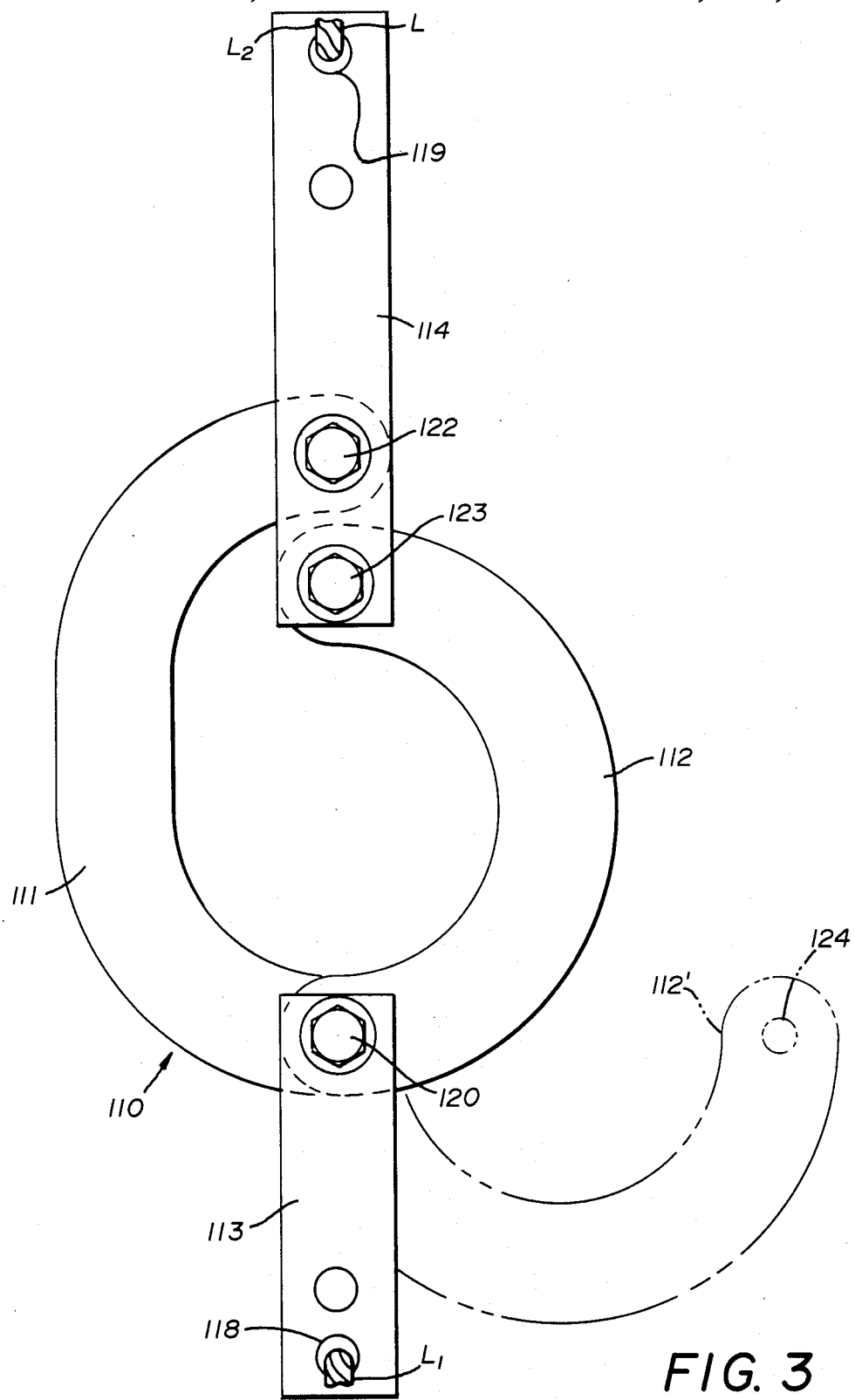
FIG. 3 is a top plan view of an alternate embodiment of the present invention.

An alternative embodiment of the present invention is shown in FIG. 3. Connector 110 includes an upper gate 111, a lower gate 112, a pole linkage element 113 and a ground linkage element 114. Linkage element 113 may be essentially a bar with a plurality of holes longitudinally spaced therethrough. A guy line L may be secured at one end $L_1$ to element 113, through hole 118, by known methods. The opposite end of guyline $L_1$ may be secured to the antenna mast. A guy line L having an end $L_2$ is similarly attached to the ground linkage element 114 through a hole 119 and to a ground anchor.

Upper gate 111 may be an arcuate bar with a bored hole near each end. Gate 111 may be rotatably linked to element 113 as by a pin joint 120. The opposite end of gate 111 may be removably linked to element 114 as by a bolt 122.

Lower gate 112 may also be an arcuate bar and is shown in FIG. 3 as being somewhat shorter in length than gate 111, so that gates 112 and 111 may be separately affixed to element 114. Gate 112 may be rotatably linked to element 113 by pin joint 120 similar to gate 111. Gate 112 may be removably linked to element 114 as by a bolt 123 engaging a bore 124 in gate 112 and a similar bore in element 112 (not shown). This arrangement prevents both gates from being accidentally loosened at the same time. It is to be appreciated that this arrangement may be accomplished so long as gates 111 and 112 are of a sufficiently different length to avoid interference therebetween. It should be clear that when gates 111 and 112 are coupled to elements 113 and 114, a generally circular opening or receiver is circumscribed by the inner arcuate perimeter of gates 111 and 112. The opening should be of sufficient area to accept the boom of an antenna array as previously described. Of course, the shape of the channel or receiver can be varied by changing the arcuate shape of gates 111 and 112 and so as to form a channel to accept a boom of different cross-sectional configuration. Also, the arcuate lengths of gates 111 and 112 can be varied so as to make a larger or smaller channel opening. For reasons which will be understood by persons skilled in the art, the bolts 122, 123 may be of a tapered shaft type to seat in tapered bores, such as bore 124, in gates 111 and 112 to maintain precise spacing between linkage elements 113 and 114 while either of gates 111 or 112 is open and during insertion or removal of either of bolts 122 and 123.

A utilization of this alternative embodiment may proceed in the following exemplary manner. The antenna array is raised with the boom substantially horizontal. Bolt 123 is removed and lower gate 112 swings down from a closed position, pivoting about pin 120, the position shown by phantom line indication 112'. The boom is then further raised to enter the receiver channel between linkage elements 113 and 114. Lower gate 112 is then swung back into a closed position and bolt 123 is again installed to secure lower gate 112. Next, bolt 122 is removed so as to allow upper gate 111 to be swung up by pivotal action about pin 120. The boom, and the antenna array generally, is then free to continue an upward movement, unimpeded by the guy lines L. Thusly, linkage elements 113 and 114 are operatively coupled as by gates 111 and 112 so as to maintain continous bracing of the antenna mast and permitting an object to pass generally transversely between elements 113 and 114 wherein gates 111 and 112 define a channel which accepts the object to be passed. The gates may be selectively opened and closed so as to permit the object to access the channel between the linkage elements from either direction.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that an apparatus constructed according to and method embodied within the concept of the present invention, and reasonably equivalent thereto, will accomplish the objects of the present invention and otherwise substantially improve the art of bracing and stabilizing structures with guy lines.

I claim:

1. Connector apparatus interposed in a support element by attachment to first and second displaced ends thereof to selectively permit an object to pass transversely through the longitudinal axis of the support element while employed to brace a structure comprising, first linkage means connected to the first end of the support element, second linkage means connected to the second end of the support element, and means coupling said first and second linkage means attached to said first linkage means and said second linkage means, said means coupling said first and second linkage means having receiver means selectively opening to either side of the support element to permit an object to pass transversely through the longitudinal axis of the support element, said means coupling said first and second linkage means is a circular disk which is freely rotatable relative to said first and second linkage means to align said receiver with openings between said first and second linkage means, said circular disk includes a flanged rim extending axially from said disk, said rim cooperating with arcuate tracks in said first and second linkage means to maintain said circular disk and said linkage means continuously coupled to maintain longitudinal continuity of the support element.

2. Apparatus according to claim 1, wherein said receiver means is a cutout channel in said circular disk which accepts an object moved transversely of the longitudinal axis of the support element so that said object enters said receiver means through one of a plurality of openings between said first and second linkage means.

3. Apparatus according to claim 1, wherein said circular disk includes a plurality of holes whereby a wrench can be employed to facilitate rotation of said circular disk.

4. Apparatus according to claim 1, wherein said receiver means is a cutout in said circular disk extending radially inwardly from the periphery to a curved inner end located substantially beyond the center of said circular disk.

5. Apparatus according to claim 4, wherein said curved inner end is a semicircle.

6. Apparatus according to claim 5, wherein said semicircle has a radius of substantially one-half of the width of said cutout.

7. Connector apparatus interposed in a support element by attachment to first and second displaced ends thereof to selectively permit an object to pass transversely through the longitudinal axis of the support element while employed to brace a structure comprising, first linkage means connected to the first end of the support element, second linkage means connected to the second end of the support element, and means coupling said first and second linkage means attached to said first linkage means and said second linkage means, said means coupling said first and second linkage means having receiver means selectively opening to either side of the support element to permit an object to pass transversely through the longitudinal axis of the support element, each said linkage means includes mating channel plates and said means coupling said first and second linkage means is a circular disk retained between said channel plates, said channel plates are arcuate and have tracks formed therein to receive an axial rim formed on said circular disk.

8. Apparatus according to claim 7, wherein said channel plates are fastened together to form a T-track in which said rim of said circular disk is disposed for selective rotation relative thereto while being retained therein.

9. Apparatus according to claim 7, wherein said circular disk has a cutout extending inwardly from the periphery thereof and said first linkage means and said second linkage means are spaced a distance in excess of the peripheral extent of said cutout.

10. Connector apparatus interposed in a support element by attachement to first and second displaced ends thereof to selectively permit an object to pass transversely through the longitudinal axis of the support element while employed to brace a structure comprising, first linkage means connected to the first end of the support element, second linkage means connected to the second end of the support element, and means coupling said first and second linkage means attached to said first linkage means and said second linkage means, said means coupling said first and second linkage means having receiver means selectively opening to either side of the support element to permit an object to pass transversely through the longitudinal axis of the support element, said means for coupling said first linkage means and said second linkage means is a plurality of gates, with each of said gates pivotally coupled at one end to one of said linkage means and selectively removably attached at the other end to the other of said linkage means.

11. Apparatus according to claim 10, wherein said plurality of gates is gates associated with the connector.

12. Apparatus according to claim 11, wherein one of said gates is longer than the other of said gates.

13. Apparatus according to claim 12, wherein each of said gates is of opposed arcuate configuration such that the inner perimeter of said gates defines said receiver means.

14. Apparatus according to claim 13, wherein each of said gates is pivotally coupled at one end to one of said linkage means and removably attached at the other end to the other of said linkage means.

15. Apparatus according to claim 14, wherein said gates are pivotally coupled about a single pin joint at said one end thereof.

16. Apparatus according to claim 15, wherein said gates are removably attached at said other ends thereof by bolts at spaced locations longitudinally of said other of said linkage means.

* * * * *

UNITED STATES PATENT AND TRADEMARK OFFICE
CERTIFICATE OF CORRECTION

PATENT NO. : 4,669,154
DATED : June 2, 1987
INVENTOR(S) : William H. MacCracken

It is certified that error appears in the above-identified patent and that said Letters Patent are hereby corrected as shown below:

Col. 8, Line 14, "attachement" should read --attachment--

Col. 8, Line 34, after "is" insert --two--.

Signed and Sealed this

Fifth Day of January, 1988

Attest:

DONALD J. QUIGG

*Attesting Officer*  *Commissioner of Patents and Trademarks*